United States Patent

Kawanami et al.

Patent Number: 5,144,499
Date of Patent: Sep. 1, 1992

[54] OPTICAL SHAPED ARTICLE FOR CRT AND HAVING PARTICULAR SPECTRAL TRANSMITTANCE CHARACTERISTICS

[75] Inventors: Seiichi Kawanami, Nakajo; Tatsuo Sugiyama, Tokyo; Yoshiro Suzuki, Ichikawa; Yasutaro Ito, Arakawa; Yuji Annaka, Toyosaka, all of Japan

[73] Assignee: Kuraray Co., Ltd., Kurashiki, Japan

[21] Appl. No.: 733,802

[22] Filed: Jul. 22, 1991

[30] Foreign Application Priority Data

Jul. 25, 1990 [JP] Japan ............................ 2-198289

[51] Int. Cl.$^5$ ............................ G02B 5/22; C03C 4/08; H04N 9/16
[52] U.S. Cl. ............................ 359/885; 359/722; 358/60; 358/253; 252/582
[58] Field of Search ............... 359/885, 886, 892, 722, 359/723; 358/60, 253; 252/582

[56] References Cited

U.S. PATENT DOCUMENTS

| | | | |
|---|---|---|---|
| 4,452,720 | 6/1984 | Harada et al. | |
| 4,542,959 | 9/1985 | Kreutzig | 359/885 |
| 4,609,945 | 9/1986 | Oguino | 359/820 |
| 4,626,071 | 12/1986 | Wada et al. | 359/885 |
| 4,642,413 | 2/1987 | Ovshinsky | 359/885 |
| 4,643,537 | 2/1987 | Vance | 354/885 |
| 4,935,166 | 6/1990 | Lee et al. | 359/885 |
| 4,987,483 | 1/1991 | Tsukagoshi | 359/589 |
| 5,055,922 | 10/1991 | Wessling | 359/589 |

FOREIGN PATENT DOCUMENTS 0168116  1/1986  European Pat. Off. .
2215910  9/1989  United Kingdom .

OTHER PUBLICATIONS

Patent Abstracts of Japan, vol. 6, No. 9 (E-90) [887], Jan. 20, 1982, JP-A-56131277, Oct. 14, 1981, T. Sugimoto, "Television Picture Projector".
Patent Abstracts of Japan, vol. 11, No. 324 (P-628), Oct. 22, 1987, JP-A-62108202, May 19, 1987, T. Hideaki, et al., "Color Filter".

*Primary Examiner*—Jon W. Henry
*Attorney, Agent, or Firm*—Oblon, Spivak, McClelland, Maier & Neustadt

[57] ABSTRACT

Provided are optical shaped articles for CRT, such as projection lens and filter used for the CRT's of projection TV's, which comprise a transparent synthetic resin containing a red dyestuff or a combination of a green organic pigment and a yellow dyestuff and having specified spectral transmittance characteristics.

12 Claims, 4 Drawing Sheets

OPTICAL SHAPED ARTICLE FOR CRT AND HAVING PARTICULAR SPECTRAL TRANSMITTANCE CHARACTERISTICS

BACKGROUND OF THE INVENTION

1. Field of the invention

The present invention relates to optical shaped articles for CRT, and more specifically to optical shaped articles used for the CRT of projection TV, such as projection lens and filter.

2. Description of the prior art

An example of conventional rear-type projection TV is described by reference to FIG. 3. The projection TV 1 is so constructed that the image sent from a color CRT 2 is enlarged with a projection lens 3 to a prescribed size, which is then, via a reflecting mirror 4, projected on a screen 5. The color CRT 2 consists of three separate CRT's for red, green and blue, and forms an image.

The color signals sent from red and green CRT's among the above three CRT's however have spectral characteristics in the visible light region as shown in FIGS. 4 and 5, which contain noise wavelengths. Consequently, projection TV's employing NTSC, PAL or similar systems give red and green having a chromaticity far different from the primary color (primary R or primary G), i.e. the colors are far from natural red and green, whereby it is difficult to obtain high-quality color images.

Accordingly, an object of the present invention is to provide an optical shaped article for CRT that can solve the above problem by cutting noise wavelengths of color signals to expand color reproduction area, thus providing high-quality color images.

Another object of the present invention is to provide a projection TV housing CRT's provided with a projection lens or filter which is included in the above optical shaped articles.

SUMMARY OF THE INVENTION

As a result of an intensive study to enhance the purity of color signals emitted from red and green CRT's, the present inventors have found that optical shaped articles comprising a transparent synthetic resin containing a dyestuff and a pigment and having a specific spectral transmittance is effective for this purpose, and completed the invention.

Thus, the above object of the present invention can be achieved by providing (1) an optical shaped article for CRT comprising a transparent synthetic resin containing a red dyestuff and having spectral transmittances of 0 to 5% at a wavelength of 570 nm, 20 to 55% at 590 nm and 80 to 95% at 620 nm; and (2) an optical shaped article for CRT comprising a transparent synthetic resin containing a green organic pigment and a yellow dyestuff and having spectral transmittances of 45 to 75% at a wavelength of 450 nm, 75 to 95% at 490 nm, 75 to 95% at 540 nm and 20 to 56% at 600 nm.

Another object of the present invention can be achieved by providing a projection TV housing color CRT's provided with a projection lens or filter comprising the above shaped article (1) and (2).

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
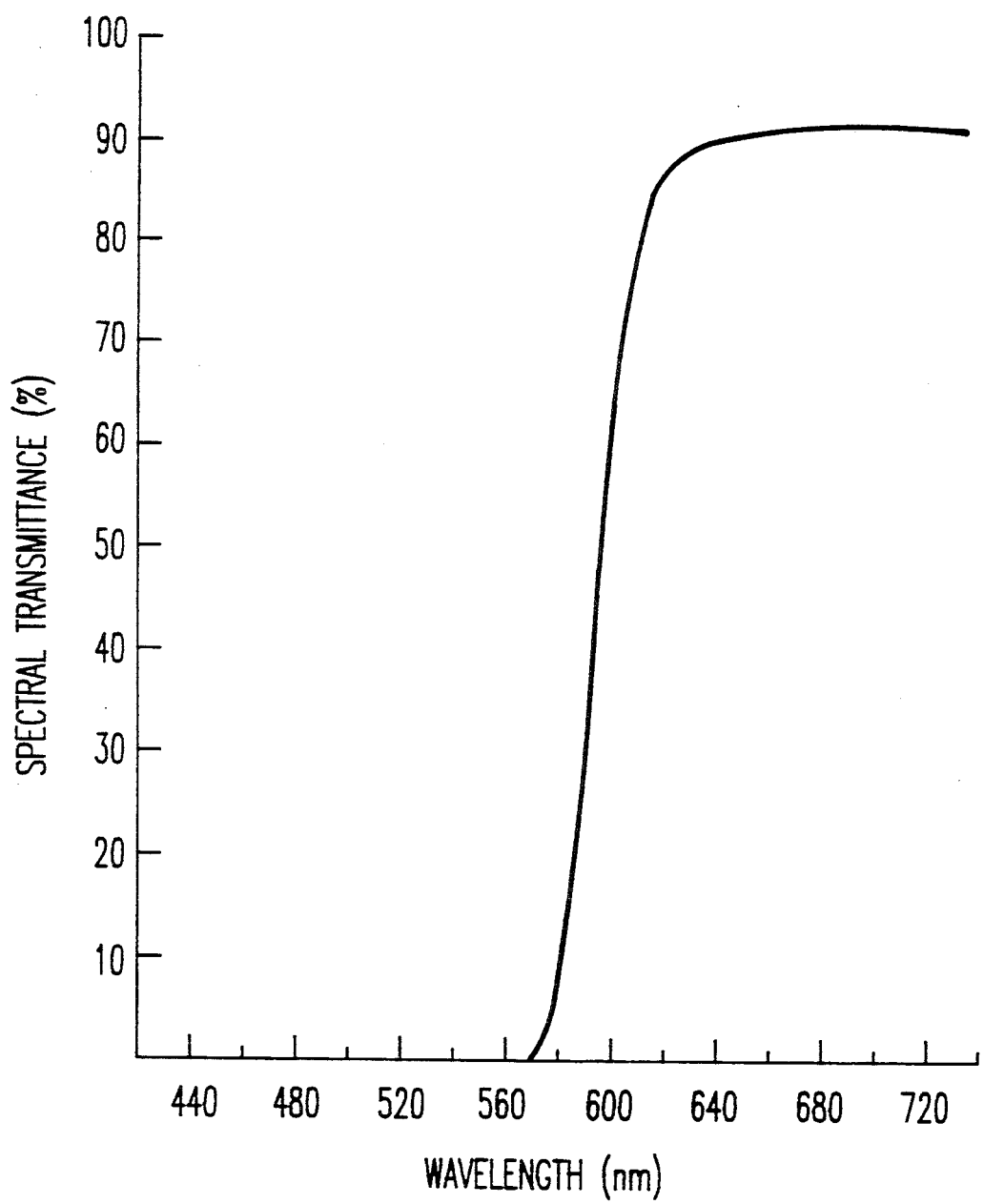
FIGS. 1 and 2 are the spectra of the shaped articles both being the embodiments of the present invention and obtained in Examples 1 and 2, respectively.

Any transparent synthetic resin can be used in the present invention and suitable examples are methacrylic, polycarbonate, styrene, allyldiglycol carbonate and like resins having a light transmittance of at least 85%, among which particularly preferred is methacrylic resin comprising methyl methacrylate units alone or as principal component.

Examples of the red dyestuff to be added to the above synthetic resin are perinon-based and anthraquinone-based ones, among which desirably used are those known by the commercial names of Diaresin Red HS, Macrolex Red EG, Sumiplast Red H3G, Diaresin Red S, Sumiplast Red AS and the like. The red dyestuff is not limited to the above, and any red dyestuff can be used insofar as the red optical shaped article incorporating it has spectral transmittances in a range of 0 to 5% at a wavelength of 570 nm, 20 to 55% at 590 nm and 80 to 95% at 620 nm. The thickness of the optical shape article of the present invention varies with no limitation depending on its shape such as projection lens or filter but generally is about 5 mm. The red dyestuff is preferably added in an amount of 0.03 to 0.15 part by weight based on 100 parts of the resin, more preferably 0.06 to 0.12 part by weight, most preferably 0.08 to 0.11 part by weight, on the same basis.

It is necessary that the optical shaped article for CRT of the present invention comprising a transparent synthetic resin containing a red dyestuff have spectral transmittances in a range of 0 to 5%, preferably 0 to 3% at a wavelength of 570 nm, 20 to 55%, preferably 20 to 45% at 590 nm and 80 to 95%, preferably 85 to 90% at 620 nm. The red dyestuff is added in such an amount that the resultant shaped article will have spectral transmittances within the above ranges. Red pigments can hardly satisfy the above spectral transmittance characteristics and are hence not desirable. If the spectral transmittances do not fall in the above ranges, the obtained color will be vague and different from natural red, whereby a high-quality color image cannot be obtained.

Examples of the green organic pigment and yellow dyestuff used in the present invention are phthalocyanine pigments and heterocyclic dyestuffs, respectively, such as Heliogen Green K8730, Helio Fast Green 6GN, Cromophthal Green GF, Dairen Blue DIP8010, Heliogen Blue K-6911D, Sumiton Cyanine Blue HB-1, Moltopren Green Paste GU 80% and Moltopren Blue Paste BUN; and Diaresin Yellow HC, Diaresin Yellow HL and Plast Yellow 8020, respectively. The green organic pigment and yellow dyestuff are not limited to the above, and any green organic pigment and yellow dyestuff can be used insofar as the green optical shaped article incorporating the green organic pigment alone or in combination with the yellow dyestuff has spectral transmittances in a range of 45 to 75% at a wavelength of 450 nm, 75 to 95% at 490 nm, 75 to 95% at 540 nm and 20 to 56% at 600 nm. The use of a green organic pigment in combination with a yellow dyestuff generally produces better performances. The thickness of the green optical shaped article of the present invention varies depending on its shape, but it is generally about 5 mm. The green organic pigment and the yellow dyestuff are preferably added in an amount of 0.001 to 0.03 part by weight based on 100 parts of the resin, more preferably 0.0025 to 0.02 part by weight on the same basis, and 0.00001 to 0.0008 part by weight, most preferably 0.0001 to 0.0005 part by weight, on the same basis, respectively. The green organic pigment is preferably of paste type, since it gives shaped articles having small haze.

It is necessary that the optical shaped article for CRT of the present invention comprising a transparent synthetic resin containing a green organic pigment and a yellow dye-stuff have spectral transmittances in a range of 45 to 75%, preferably 50 to 65% at a wavelength of 450 nm, 75 to 95%, preferably 80 to 90% at 490 nm, 75 to 95%, preferably 85 to 90% at 540 nm and 20 to 56%, preferably 25 to 50% at 600 nm. The green organic pigment and yellow dyestuff are added in such an amount that the resultant shaped article will have spectral transmittances within the above ranges. Green dyestuffs can hardly satisfy the above spectral transmittance characteristics and are hence not desirable. If the spectral transmittances do not fall in the above ranges, the obtained color will be vague and different from natural green, whereby a high-quality color image cannot be obtained.

The optical shaped articles of the present invention can be of lens-, disc-, plate- or like shapes and used as projection lens, filter and the like for color CRT. These optical shaped articles may contain small amounts of additives such as ultraviolet absorber and heat stabilizer within limits not to impair the purpose of the present invention. These shaped articles can be produced by any process including casting, extrusion molding, injection molding, compression molding and like molding and/or forming processes, among which injection molding that assures mass production at a low cost is preferably used.

Mounting a projection lens containing at least one red lens obtained by the above process on a red CRT or mounting the red filter on the front or back of the projection lens of a red CRT can almost eliminate the noise wavelengths of red color signals. Likewise, mounting a green projection lens containing at least one green lens obtained by the above process on a green CRT or mounting the green filter on the front or back of the projection lens of a green CRT can almost eliminate the noise wavelengths of green color signals. Consequently, in projection TV's housing color CRT's provided with these projection lenses or filters noise wavelengths that otherwise appear in red and green color signals can nearly completely be eliminated so that the chromaticities of the obtained red and green will approach those of the primary colors, whereby high-quality color images can be realized. In certain cases, mounting the green shaped article alone, without using the red one, for the objective green CRT can produce the same effect.

As described heretofore, the optical shaped articles for CRT of the present invention comprise a transparent synthetic resin colored such that their spectral transmittance characteristics satisfy specified conditions at specified wavelengths and hence they can give sharp images by cutting noise wavelengths. Mounting the shaped article as a projection lens or filter for a color CRT can give high-quality images with the red and green signals getting close to the primary colors.

The projection lenses and filters for CRT of the present invention can be produced by injection molding, which allows for mass production at low costs, and are therefore valuable. In particular, they are suitably used for projection TV's, which have been widely spreading in the market in recent years, and can provide high-quality color images.

Other features of the invention will become apparent in the course of the following descriptions of exemplary embodiments which are given for illustration of the invention an are not intended to be limiting thereof. In the Examples that follow "parts" means "parts by weight".

EXAMPLES

Examples 1 and 2

To 100 parts of polymethyl methacrylate containing 6% of units from ethyl acrylate was added 0.09 part of a red dyestuff of Diaresin Red HS (made by Mitsubishi Chemical Industries Ltd.). The mixture was blended in a super mixer and then extruded through an extruder to form pellets. The pellets obtained were molded through an injection molding machine into disc-shaped articles having a thickness of 5 mm. One of the red articles was mounted as a filter on the projection lens of a red CRT of a projection TV. A green filter containing 0.0028 part of a green organic pigment (Heliogen Green K8730, made by BASF) and 0.00025 part of a yellow dyestuff (Diaresin Yellow HC, made by Mitsubishi Chemical Industries Ltd.) in the same manner as above and mounted on the projection lens of a green CRT.

The red and green CRT's with the projection lenses provided with the filters were evaluated for chromaticity in terms of XYZ color specification system using a colorimeter (CS-100, made by Minolta Camera Co., Ltd.) and the results are shown in Tables 1 and 2 respectively. The tables also show the results of test for spectral transmittance with a color analyzer (Type 307, made by Hitachi, Ltd.). These CRT's gave, by the mounting of the filters, high-quality color images having more natural tone of red and green as compared with that obtained with the CRT's without the filters.

Figure 2:
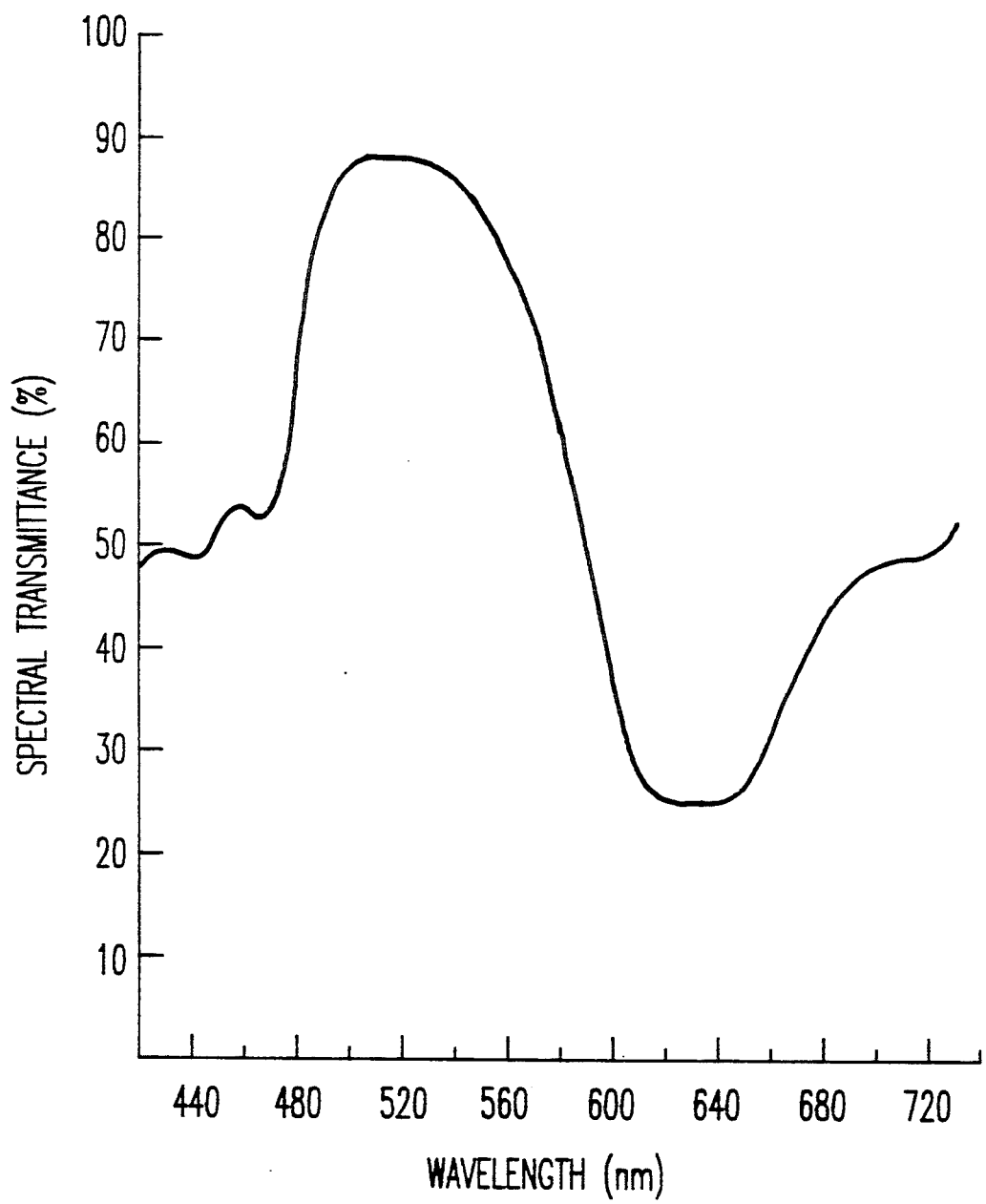
Figure 3:
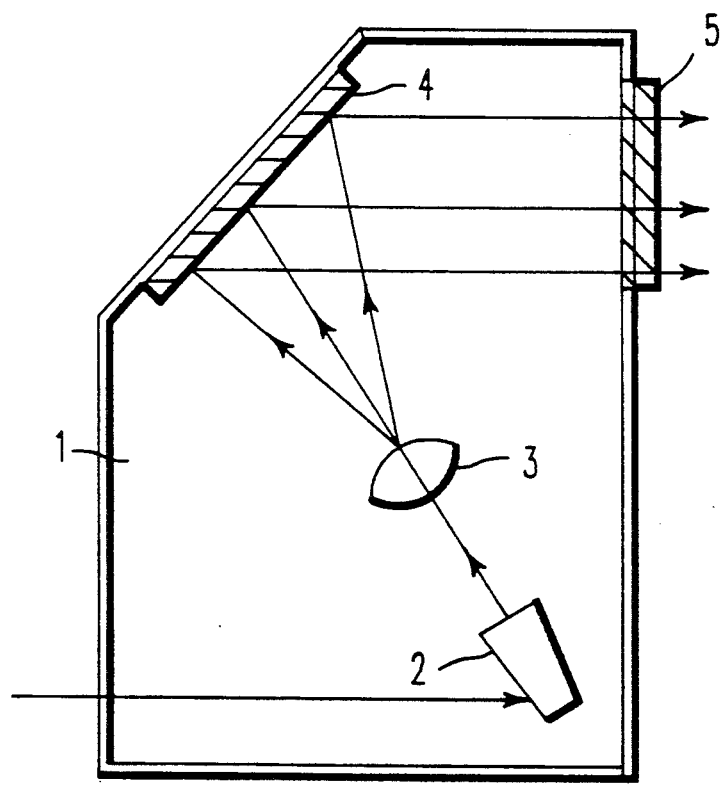
FIG. 3 is a cross-sectional view of a conventional projection TV.
Figure 4:
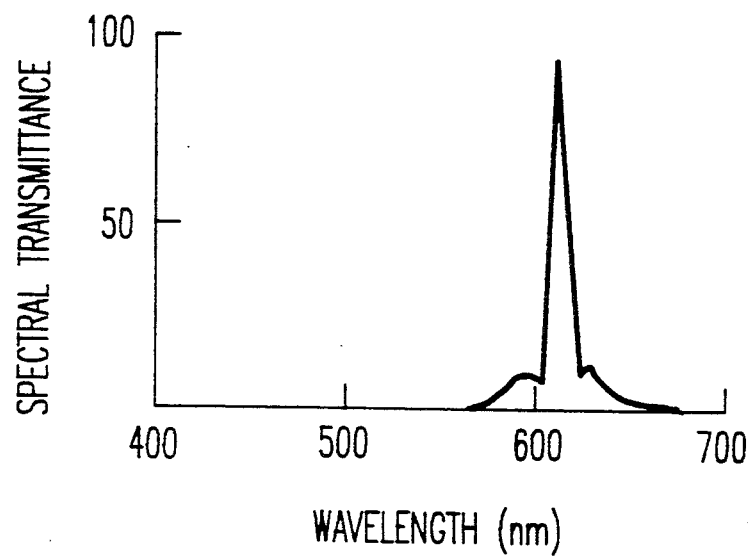
FIGS. 4 and 5 are the spectra of color signals sent from red and green CRT's respectively.
Figure 5:
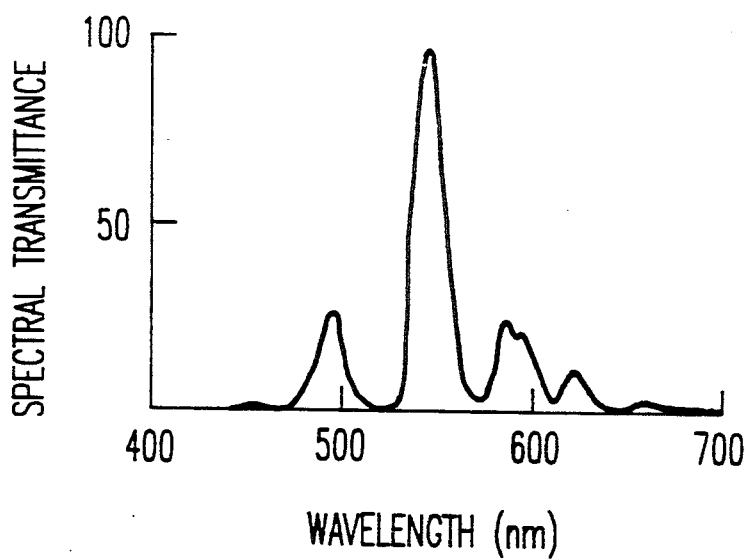

FIGS. 1 and 2 show the spectral chart of the red and green obtained by the use of the above filters, respectively. Tables 1 and 2 also show the spectral transmittances at principal wavelengths.

REFERENCE EXAMPLE

The chromaticities in XYZ system of the primary red and primary green of NTSC system are shown in Tables 1 and 2 respectively.

COMPARATIVE EXAMPLES 1 AND 2

The chromaticities in XYZ system for the CRT's of Examples 1 and 2 without the filter are shown in Tables 1 and 2.

EXAMPLES 3 THROUGH 5

Two red filters and a green one were prepared in the same manner as in Example 1 except for using 0.12 part and 0.13 part of Diaresin Red HS for the red filters and 0.006 parts of Dairen Blue DIP8010 and 0.00045 part of Diaresin Yellow HC for the green filter. The filters were tested for chromaticity and spectral transmittance, and the results are shown in Tables 1 and 2. The filters, when mounted on projection lens, give considerably natural and sharp red and sharp and natural green, respectively, as compared with the colors obtained without the filters.

COMPARATIVE EXAMPLES 3 THROUGH 6

Two red filters and two green ones were prepared in the same manner as in Example 1 except for using 0.015 part and 0.05 part of Diaresin Red HS for the red filters and combinations of 0.004 part of Heliogen Green K8730 and 0.0007 part of Macrolex Yellow R and 0.0016 part of Heliogen Green 8680 and 0.0005 part of Diaresin Yellow HC for the green filters. The filters were tested for chromaticity and spectral transmittance, and the results are shown in Tables 1 and 2. The filters, both for red and green, gave yellowish colors and could not give sharp images.

TABLE 1

| Item | | Chromaticity X | Y | Spectral transmittance (%) 570 nm | 590 nm | 620 nm |
|---|---|---|---|---|---|---|
| Reference Example | Primary red (NTSC) | 0.67 | 0.33 | — | — | — |
| Example 1 | With red filter | 0.67 | 0.33 | 2 | 34 | 87 |
| Example 3 | With red filter | 0.68 | 0.32 | 0.5 | 25 | 85 |
| Example 4 | With red filter | 0.67 | 0.33 | 0 | 20 | 84 |
| Comparative Example 1 | Without filter | 0.65 | 0.35 | — | — | — |
| Comparative Example 3 | With red filter | 0.64 | 0.36 | 16 | 65 | 90 |
| Comparative Example 4 | With red filter | 0.67 | 0.34 | 8 | 57 | 90 |

TABLE 2

| Item | | Chromaticity X | Y | Spectral transmittance (%) 450 nm | 490 nm | 540 nm | 600 nm |
|---|---|---|---|---|---|---|---|
| Reference Example | Primary green (NTSC) | 0.21 | 0.71 | — | — | — | — |
| Example 2 | With green filter | 0.31 | 0.61 | 52 | 83 | 86 | 37 |
| Example 5 | With green filter | 0.30 | 0.62 | 50 | 83 | 81 | 25 |
| Comp. EX. 2 | Without filter | 0.34 | 0.58 | — | — | — | — |
| Comp. EX. 5 | With green filter | 0.35 | 0.64 | 1 | 0 | 79 | 32 |
| Comp. EX. 6 | With green filter | 0.33 | 0.62 | 49 | 83 | 89 | 58 |

EXAMPLE 6

To 100 parts of polymethyl methacrylate was added 0.007 part of a green organic pigment of Moltopren Green Paste GU80% (made by Beyer) and 0.0004 part of a yellow dyestuff of Diaresin Yellow HC (made by Mitsubishi Chemical Industries Ltd.). The mixture was blended in a super mixer and then extruded through an extruder to form pellets. The pellets obtained were molded through an injection molding machine into disc-shaped articles having a thickness of 5 mm. One of the green articles was mounted as a filter on the projection lens of a green CRT of a projection TV.

The green CRT's with the projection lens provided with the filter was evaluated for chromaticity in terms of XYZ color specification system using a color tester (CS-100, made by Minolta Camera Co., Ltd.) and the results are shown in Table 3. The table also shows the results of test for spectral transmittance with a color analyzer (Type 307, made by Hitachi, Ltd.).

The CRT gave, by the mounting of the filter, high-quality color images having more sharp and natural tone of green as compared with that obtained with the CRT without the filter, while being free from reduction in color contrast due to addition of an organic pigment.

In Table 3, "Relative contrast" means the ratio of the contrast to that of 100 without the filter.

EXAMPLE 7

A green filter was prepared in the same manner as in Example 6 except for using 0.02 part of a green organic pigment of Moltopren Blue Paste BUN (made by Bayer) and 0.0003 part of a yellow dyestuff of Diaresin Yellow HC (made by Mitsubishi Chemical Industries Ltd.), and tested for chromaticity and spectral transmittance. The results are shown in Table 3. By mounting the filter, the CRT gave sharp images with more natural green than with the CRT without the filter, while the color contrast was kept undecreased.

TABLE 3

| | Chromaticity X | Y | Spectral transmittance (%) 450 nm | 490 nm | 540 nm | 600 nm | Relative contrast (%) |
|---|---|---|---|---|---|---|---|
| Example 6 | 0.29 | 0.62 | 48 | 80 | 89 | 55 | 99 |
| Example 7 | 0.29 | 0.61 | 55 | 83 | 84 | 45 | 98 |

Examples 8 and 9 and Comparative Examples 7 and 8

Green filters were prepared using pigments and dyestuffs as shown below in amounts as shown, and tested for chromaticity and spectral transmittance. The results are shown in Table 4.

TABLE 4

| Pigments and dyestuffs | Part |
|---|---|
| Example 8 | |
| Heliogen Green K8730 | 0.0032 |
| Diaresin Yellow HC | 0.0003 |
| Example 9 | |
| Moltopren Green Paste GU80% | 0.018 |
| Diaresin Yellow HC | 0.00005 |
| Comparative Example 7 | |
| Heliogen Green K8730 | 0.0016 |
| Macrolex Yellow R | 0.0026 |
| Comparative Example 8 | |
| Moltopren Green Paste GU80% | 0.02 |
| Diaresin Yellow HC | 0.006 |

| | Chromaticity X | Y | Spectral Transmittance (%) 450 nm | 490 nm | 540 nm | 600 nm |
|---|---|---|---|---|---|---|
| Example 8 | 0.30 | 0.62 | 52 | 84 | 86 | 36 |
| Example 9 | 0.28 | 0.61 | 70 | 87 | 86 | 31 |
| Comparative Example 7 | 0.34 | 0.64 | 15 | 10 | 86 | 57 |
| Comparative | 0.33 | 0.66 | 3 | 2 | 81 | 28 |

Obviously, numerous modifications and variations of the present invention are possible in light of the above teachings. It is therefore to be understood that within the scope of the appended claims, the invention may be practiced otherwise than as specifically described herein.

What is claimed is:

1. An optical shaped article for a CRT comprising a transparent synthetic resin containing a red dyestuff and having spectral transmittances of 0 to 5% at a wavelength of 570 nm, 20 to 55% at 590 nm and 80 to 95% at 620 nm.

2. An optical shaped article for a CRT according to claim 1, wherein said red dyestuff is a perinon dyestuff and contained in an amount of 0.03 to 0.15 part by weight based on 100 parts of said transparent synthetic resin.

3. An optical shaped article for a CRT according to either claim 1 or 2, wherein said synthetic resin is methacrylic resin.

4. A projection lens comprising an optical shaped article for a CRT according to claim 1.

5. A filter comprising an optical shaped article for a CRT according to claim 1.

6. A projection TV housing a red CRT provided with a projection lens according to claim 4 or a filter according to claim 5.

7. An optical shaped article for a CRT comprising a transparent synthetic resin containing a green organic pigment and a yellow dyestuff and having spectral transmittances of 45 to 75% at a wavelength of 450 nm, 75 to 95% at 490 nm, 75 to 95% at 540 nm and 20 to 56% at 600 nm.

8. An optical shaped article for a CRT according to claim 7, wherein said transparent synthetic resin contains a phthalocyanine-based organic pigment and a heterocyclic yellow dyestuff in an amount of 0.001 to 0.03 part by weight and 0.00001 to 0.0008 part by weight based on 100 part of said resin, respectively.

9. An optical shaped article for a CRT according to either claim 7 or 8, wherein said synthetic resin is methacrylic resin.

10. A projection lens comprising an optical shaped article for a CRT according to claim 7.

11. A filter comprising an optical shaped article for a CRT according to claim 7.

12. A projection TV housing a green CRT provided with a projection lens according to claim 10 or a filter according to claim 11.

* * * * *